United States Patent
Falk-Pedersen et al.

(10) Patent No.: US 6,228,145 B1
(45) Date of Patent: May 8, 2001

(54) METHOD FOR REMOVING CARBON DIOXIDE FROM GASES

(75) Inventors: Olav Falk-Pedersen, Tønsberg; Henrik Dannström, Sandefjord, both of (NO)

(73) Assignee: Kvaerner ASA, Lysaker (NO)

( * ) Notice: Subject to any disclaimer, the term of this patent is extended or adjusted under 35 U.S.C. 154(b) by 0 days.

(21) Appl. No.: 09/230,971
(22) PCT Filed: Jul. 21, 1997
(86) PCT No.: PCT/NO97/00190
§ 371 Date: Aug. 20, 1999
§ 102(e) Date: Aug. 20, 1999
(87) PCT Pub. No.: WO98/04339
PCT Pub. Date: Feb. 5, 1998

(30) Foreign Application Priority Data

Jul. 31, 1996 (NO) .................................................. 963198

(51) Int. Cl.⁷ ........................................................ B01D 53/22
(52) U.S. Cl. ............................ 95/44; 95/46; 95/51; 96/5; 96/6; 96/7
(58) Field of Search .................... 95/44.51, 45, 46; 96/5, 8, 6, 7; 423/228, 229

(56) References Cited

U.S. PATENT DOCUMENTS

| | | | |
|---|---|---|---|
| 4,147,754 | 4/1979 | Ward, III | 423/224 |
| 4,750,918 | * 6/1988 | Sirkar | 95/44 |
| 4,900,448 | * 2/1990 | Bonne et al. | 95/44 |
| 5,082,472 | 1/1992 | Mallouk et al. | 55/16 |
| 5,273,572 | 12/1993 | Baker et al. | 95/48 |
| 5,281,254 | 1/1994 | Birbara et al. | 95/44 |
| 5,389,126 | 2/1995 | Baker et al. | 95/45 |
| 5,407,467 | 4/1995 | Lokhandwala et al. | 95/49 |
| 5,580,452 | * 12/1996 | Lin | 96/5 X |
| 5,749,941 | * 5/1998 | Jansen et al. | 96/5 X |
| 5,876,486 | * 3/1999 | Steinwandel et al. | 95/44 |
| 5,954,858 | * 9/1999 | Peretti et al. | 95/44 |

FOREIGN PATENT DOCUMENTS

| | | |
|---|---|---|
| 0 439 877 A1 | 8/1991 | (EP) . |
| 0 451 715 A1 | 10/1991 | (EP) . |
| 0 658 372 A2 | 6/1995 | (EP) . |
| WO 95/21683 | 8/1995 | (WO) . |
| WO 95/26225 | 10/1995 | (WO) . |

* cited by examiner

Primary Examiner—Robert H. Spitzer
(74) Attorney, Agent, or Firm—Fish & Neave; Edward M. Arons; Robert W. Morris

(57) ABSTRACT

A method for removing and preventing discharge into the atmosphere of carbon dioxide from combustion gases and natural gas from installations for production of oil and/or gas, wherein the combustion gas is passed to an absorber containing a solvent, where carbon dioxide is absorbed in the solvent, and the thereby purified combustion gas, largely free of carbon dioxide, is released into the atmosphere, where the $CO_2$ rich solvent is passed to a desorber where $CO_2$ is removed from the solvent, and the thereby largely $CO_2$-free solvent is recycled to the absorber, and the separated $CO_2$ gas is passed to a compression stage for compression and utilization and/or disposal in a suitable manner, where membrane gas/liquid contactors are employed in both the absorber and the desorber, and that an external stripping steam is supplied to the desorber.

60 Claims, 4 Drawing Sheets

Fig.1 ABSORPTION PROCESS

MEMBRANE GAS / LIQUID CONTACTOR - PRINCIPLE DRAWING

Fig. 3 NEW PROCESS

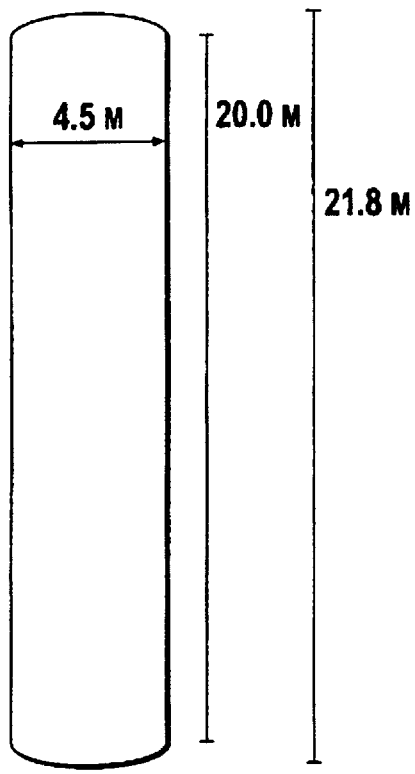
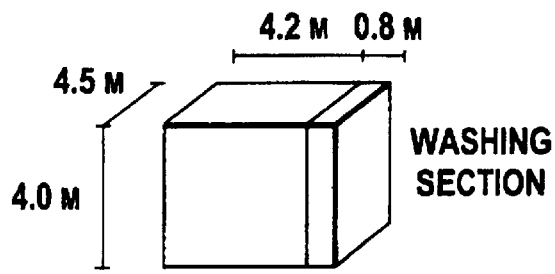
COMPARISON OF ABSORPTION COLUMN AND
MEMBRANE GAS / LIQUID CONTACTOR
Fig. 4

METHOD FOR REMOVING CARBON DIOXIDE FROM GASES

The present invention relates to a method for removing carbon dioxide from combustion gases and natural gas.

The removal of carbon dioxide or other compounds from gases may be desirable or necessary for a number of reasons. If a gas is to be burned as fuel or emitted into the atmosphere as a waste flow, the removal of carbon dioxide from the gas is necessary in order to satisfy the carbon dioxide emission requirements which are set by air pollution control authorities. By removing $CO_2$ from natural gas, a natural gas is obtained which satisfies sales specifications or other process-dependent requirements.

Several processes for removing carbon dioxide from gases are known, including those from EP patent applications nos. 410845, 502596, 537593, 551876, 553643, 558019 and 588175. In the applicant's Norwegian patent application no. 940527 there is further disclosed a method for removing and preventing discharge into the atmosphere of carbon dioxide from combustion gases from thermal power machines, especially gas turbines, for production of oil and/or gas where about 40% of the combustion gas is recycled to the compressor inlet for the gas turbine before the combustion gas if passed to the absorption stage of the process.

Gas absorption is a unit operation where one or more components in a gas mixture are dissolved in a liquid (solvent). The absorption may either be a purely physical phenomenon or involve a chemical reaction, such as the reaction between $CO_2$ and monoethanolamine (MEA).

An absorbed component is normally removed from the solvent by means of a distillation or stripping process, see FIG. 1.

An example of an absorption process is the process for removing $CO_2$ from flue gas by means of the monoethanolamine. The flue gas is led into an absorption column where it comes into contact with MEA which absorbs the $CO_2$ molecules. The solvent is then led to a desorption process where the liquid is heated, and the $CO_2$ molecules are removed from the solvent by means of a desorption column. The solvent is cooled and passed back to the absorption column, while the concentrated $CO_2$ is removed.

When an absorption column is designed, there are two important factors which determine the size:

i) The amount of gas which has to be treated often or in most cases determines the diameter of the column. If the rate of the gas flow upwards in the column becomes too high due to a too small tower diameter, it will bring with it the solvent which is intended to run downwards in the column, resulting in flooding.

ii) The degree of purification determines the height of the column. In order to have components from the flue gas absorbed, the components have to meet the solvent. In other words what is required is a certain liquid surface ($m^2$) in contact with the gas. Inside the absorption column there is equipment which is designed in such a manner that the gas which flows upwards comes into the best possible contact with solvent which is running downwards (highest possible packing factor $m^2/m^3$). This means that the height of the column is determined by the degree of purification/required liquid area. If the physical absorption goes slowly or the chemical reaction in the absorption column has a low reaction rate, it may be the residence time required for the solvent which determines the height of the column.

When a desorption column is designed the same rules/restrictions apply in principle. The diameter of the desorption column is also determined in many cases by the amount of stripping gas required, while the height is determined by the purity desired in the solvent which is employed.

In connection with absorption processes there will be a consumption of solvent, principally due to evaporation of the solvent in the absorption column; evaporation of the solvent in the desorption column; degrading of the solvent, particularly in connection with the boiler/reboiler where the solvent is degraded due to high surface temperature on the surfaces which transfer the heat to the solvent; chemical degradation due to impurities in the system; and/or carry-over of drops of solvent which accompany the gas.

In most absorption/desorption processes, particularly processes where amines are used, corrosion is a problem. Corrosion arises mainly in the absorption column, the desorption column and the boiler/reboiler, and the corrosion products which are formed must be removed by means of filters in order to avoid problems in the process.

In connection with the operation of absorption and desorption columns foaming can be a major problem. Foaming can occur for many reasons including particles in the solvent (e.g. corrosion products). In present processes a careful watch is kept on possible foaming, which is combated with the use of filters, alteration in the operation of the actual column and/or by means of chemicals.

If the packing material in the columns is not packed in a completely uniform fashion, channels will be formed where the gas can move with low pressure loss, with the result that a part of the gas will remain untreated, or pass through the column with a reduced degree of absorption. This applies both to the absorption and the desorption column.

With regard to the operation of absorption processes the greatest possible flexibility is to be desired with a view to the amount of gas which has to be treated, circulation rate and steam which is employed. When columns are used the flexibility is limited due, amongst other reasons, to the carry-over of solvents, flooding and wetting of the packing surfaces.

In the absorption processes which are used in the treatment of natural gas hydrocarbons and BTX aromatics from the natural gas are absorbed by the solvent and stripped from the solvent in the desorption column. The loss of hydrocarbons requires to be minimised for economic reasons, while the discharge of BTX aromatics from the desorption column requires to be minimised for environmental reasons.

In connection with the choice/development of solvent the viscosity and surface tension of the liquid are important in order to ensure that the packing material in the absorption and desorption columns is wetted/covered by liquid, thus causing the liquid to run downwards in the column in an optimum manner. In order to ensure this, it is not always possible to employ the solvent which is optimal for the process. The reactant(s) which are active for the absorption process are normally dissolved in a liquid which does not itself participate directly in the absorption reactions, e.g. MEA is often dissolved in water. Such physical solvents (in some cases a large percentage of liquids are employed which do not affect the process, such as water) are necessary in order to give the solvent the optimum total characteristic. This use of liquids which are "unnecessary or neutral" for the process increases the energy consumption of the process due to a high circulation rate (liquid flow in circulation) which gives increased pump work and high energy consumption in the boiler/reboiler, thus requiring unnecessary liquid to be heated up to the desorption temperature.

When absorption and desorption columns are employed solvent must be chosen which has good mass transfer properties for the component, such as $CO_2$, which has to be absorbed and desorbed, in order thereby to keep the size of the absorption and desorption columns at an acceptable level. A contactor with a large contact area between gas and liquid per volume unit will open the way for the use of more stable, economical and environmentally correct solvents.

With regard to the removal of $CO_2$ from natural gas, for environmental reasons the depositing of $CO_2$ has become a subject of current interest. In commercial processes where amines are employed for separation of $CO_2$ from natural gas, $CO_2$ is desorbed at or very close to atmospheric pressure. It is desirable to be able to desorb $CO_2$ at a somewhat higher pressure in order to save compression energy. Due to the degradation of amine it is difficult to implement this since the temperature has to be increased in the desorption column. The amount of amine which degrades in the boiler/reboiler increases exponentially with the amine temperature in the boiler/reboiler.

With a view to achieving more optimal absorption/desorption processes an absorption/desorption technology has now been developed which can be used in several absorption/desorption processes. The technology developed provides an optimized process with regard to weight, cost, energy consumption and environmental aspects.

After having evaluated different solutions, an optimized process has now been produced which utilizes membrane gas/liquid contactors both in the absorber and the desorber.

If a membrane is placed between the gas and the solvent, the solvent will not be in direct contact with the gas which is in motion. This division between the gas and solvent phases makes it possible to employ a high gas rate in the absorber without the liquid being carried along by the gas, and in FIG. 2 a principle drawing is shown of the current technology. The size of the pores in the membrane is selected according to the following reasoning: the pores are so large that the X molecules (e.g. $CO_2$) move (diffuse) rapidly through the pores and into the solvent, and the pores are so small that solvent does not penetrate into the pores and through the membrane.

It is an object of the present invention to provide membrane gas/liquid contactors both in the absorber and desorber, as illustrated in FIG. 3 for the present process, where the extent of the absorption process is substantially reduced since the membrane contactor has a high packing factor ($m^2/m^3$). This gives a reduction in weight and volume for both the absorber and the desorber compared with conventional columns.

It is a second object of the invention to avoid foaming. Since there is not contact between gas and solvent, no foaming will occur. It will be possible to reduce the number of filters and the use of defoaming agent when membrane contactors are employed both in the absorber and the desorber.

It is a further object of the invention to avoid channelling, since the membranes are assembled with a uniform pitch, the distance between the membranes being uniform.

Yet another object of the invention is to avoid carry-over of the solvent. The solvent is not pushed out of the absorber or the desorber due to a high gas rate.

A further object of the invention is to achieve a process which in total is very flexible and thereby simpler to operate since there is no contact between the gas and the solvent in both the absorber and the desorber. The amount of feed gas, circulation rate and amount of stripper gas may be varied independently of one another.

It is a further object of the invention to reduce the absorption of hydrocarbons and BTX aromatics, thus reducing the loss of hydrocarbons and the discharge of BTX aromatics, by optimization of the membrane type, pore size, surface tension, etc.

It is a further object of the invention to permit optimization of the solvent by the use of the membrane gas/liquid contactor in both the absorber and the desorber, since more flexible requirements are placed on the solvent's physical properties, such as viscosity and surface tension. The liquid is pumped through the membrane modules' liquid channels. The amount of passive liquid in the solvent whose only function is to supply the liquid with the desired physical properties can be reduced or completely removed. The use of process-optimal solvents will reduce the total energy consumption of the process.

It is a further object of the invention to be able to use solvents with lower mass transfer coefficients due to the membrane gas/liquid contactor's high packing factor. The size of the absorber and the desorber are reduced to such an extent that it is acceptable to use solvents which, e.g., only have half as good mass transfer as today's solvents, without the absorber and the desorber becoming unacceptably large. This effect opens the way for the use of new or other solvents which provide a lower energy consumption, less consumption of solvent and fewer environmental problems.

A further object of the invention is to substantially reduce the corrosion problem by means of membrane contactors in both the absorber and the desorber, since the absorber and the desorber are principally constructed of polymers. Due to the reduced equipment size by using a membrane gas/liquid contactor both in the absorber and the desorber, it may be economically justified to use high steel in the connecting pipework. This will reduce the corrosion rate and thereby further minimise operational problems, and reduce the consumption of corrosion inhibitors.

It is a further object of the invention to reduce the consumption of solvent, since the correct choice of membranes reduces the evaporation from the absorber and the desorber. It is particularly important that the process employs external steam, i.e. a boiler/reboiler should not be used. The membrane contactor is also used in order to transfer necessary desorption heat, i.e. the membrane contactor both transfers molecules from the solvent to the stripper gas while at the same time transferring heat from the stripper gas to the solvent. This eliminates the degradation and the corrosion which normally take place in the boiler/desorber. If necessary, a preheater may be installed upstream of the desorber.

A further object of the invention is to permit the implementation of desorption at a somewhat higher pressure than atmospheric by means of membrane contactors in the desorber in amine processes for separation of $CO_2$. This is possible due to the use of stripper steam instead of the boiler/reboiler, which would cause an unacceptable degree of degradation of the amine. The degradation rate of the amine may also be reduced by eliminating the reboiler encountered in conventional processes. Instead, the membrane contactor may act as a heat exchanger and provide the necessary heat for desorption through heat transfer from externally supplied vapor through the membrane to the amine solution.

According to the present invention a method is provided for removing and preventing discharge into the atmosphere of carbon dioxide from combustion gases and natural gas from installations for production of oil and/or gas, where the combustion gas is passed to an absorber containing a solvent, where carbon dioxide is absorbed in the solvent, and the thereby purified combustion gas, largely free of carbon dioxide, is released into the atmosphere, where the $CO_2$-rich solvent is passed to a desorber where $CO_2$ is removed from the solvent, and the thereby largely $CO_2$-free solvent is recycled to the absorber, and the separated $CO_2$ gas is passed to a compression stage for compression and utilization and/or disposal in a suitable manner, which is characterized by the use of membrane gas/liquid contactors in both the absorber and the desorber, and that an external stripping steam is supplied to the desorber.

This and other features of the present invention are presented in the following patent claims.

The theoretical calculations and tests which have been conducted for the present invention have demonstrated that membrane gas/liquid contactors can advantageously replace both absorption and desorption columns. FIG. 4 shows a typical comparison of a conventional gas/liquid contactor and a membrane gas/liquid contactor of the present invention.

The mass transfer coefficient is defined/calculated by means of the following equation:

$$k = \frac{Q}{A_m} \ln\left(\frac{yi_n}{y_{out}}\right)$$

$k$ = mass transfer coefficient (m/s)
$Q$ = volume flow ($Nm^3$/s)
$A_m$ = membrane area ($m^2$)
$y_{in}$ = mol fraction $X$ into the absorber/desorber
$y_{out}$ = mol fraction $X$ out of the absorber/desorber The mass transfer coefficient will vary from process to process, but for the tested absorption/desorption processes the combination of mass transfer coefficient and packing factor for the membrane system gives a reduction of between 40–95% in the size and weight of the absorber and the desorber compared with conventional towers with standard tower packings.

For separation of $CO_2$ by means of amine systems the following values have been measured and calculated:
The absorber: $(0.1–8.0)10^{-3}$ m/s
The desorber: $(0.1–2.0)10^{-3}$ m/s Theoretically a membrane gas/liquid contactor with a high membrane packing density ($m^2/m^3$) will reduce the required equipment size to carry out a contacting process providing the mass transfer for the process is good enough. It is proven that the packing density for a membrane contactor can be 500–1000 $m^2/m^3$ compared to typically 100–200 $m^2/m^3$ for traditional structured packing columns.

The mass transfer coefficent has been measured for a number of processes and running conditions by laboratory work at various locations. These numbers show that by using a membrane gas/liquid contactor both in the absorber and desorber, significant reductions in both equipment size and weight can be achieved.

EXAMPLE

This example is intended to be illustrative of the invention and is not meant to be construed as limiting the scope of the invention.

Desorption of $CO_2$ from monoethanolamine through water vapor stripping, sized to desorb 233 kmole/h $CO_2$:

|  | Conventional Desorber | Membrane G/L Contactor (500$m^2/m^3$) |
| --- | --- | --- |
| Dimensions | 19.2 m height 2.2 m OD | width 1.4 m height 1.4 m length 2.5 m |
| Weight, dry | 20 tonnes | 2 tonnes |

For an offshore application, further weight reduction may be achieved by the decreased amount of structural steel needed to support the unit.

BRIEF DESCRIPTION OF THE DRAWINGS

The above and other objects and advantages of the invention will be apparent upon consideration of the following detailed description, taken in conjunction with the accompanying drawings, and in which.

Figure 1:
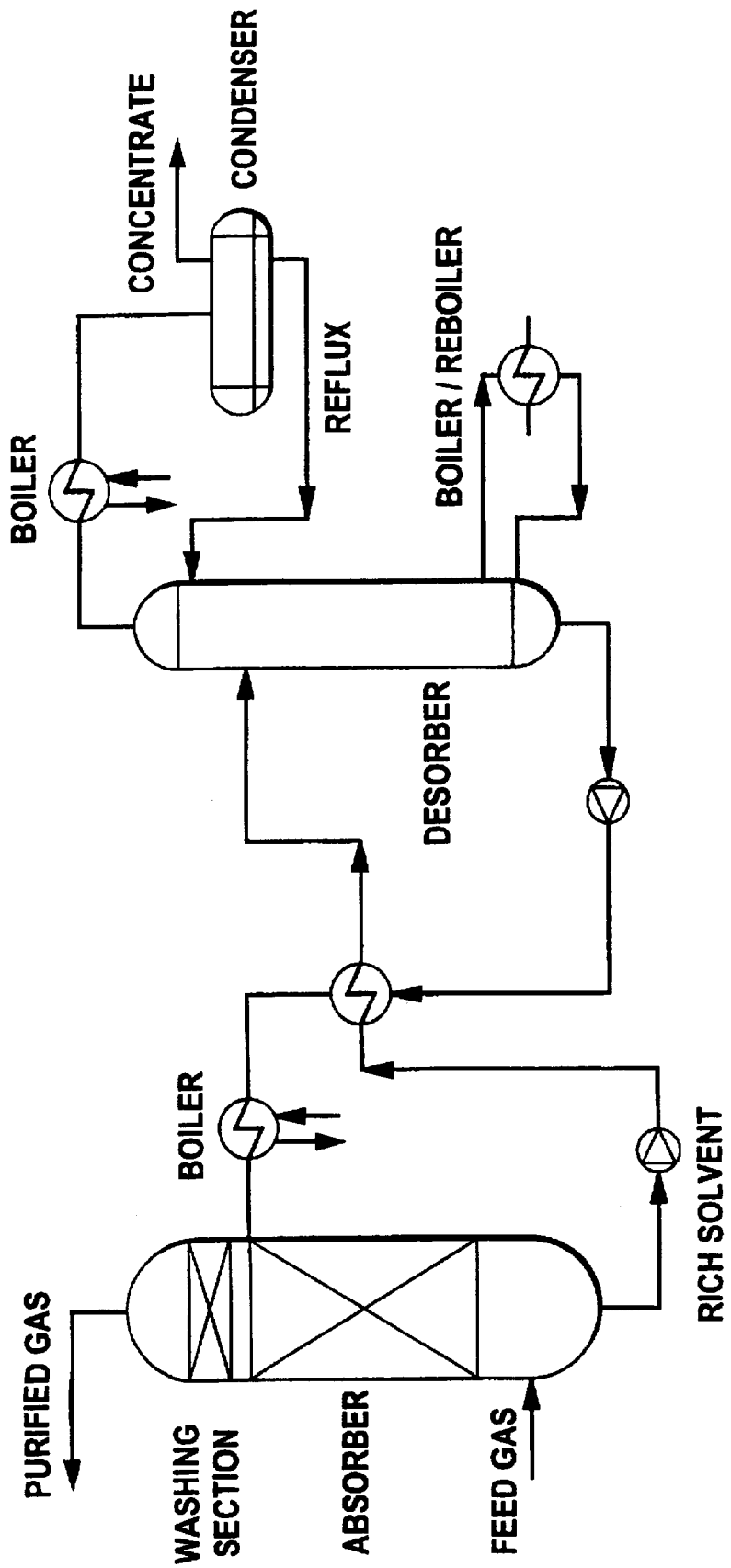
FIG. 1 is a process flow diagram illustrating an embodiment of a gas absorption process by means of a distillation or stripping.
Figure 2:
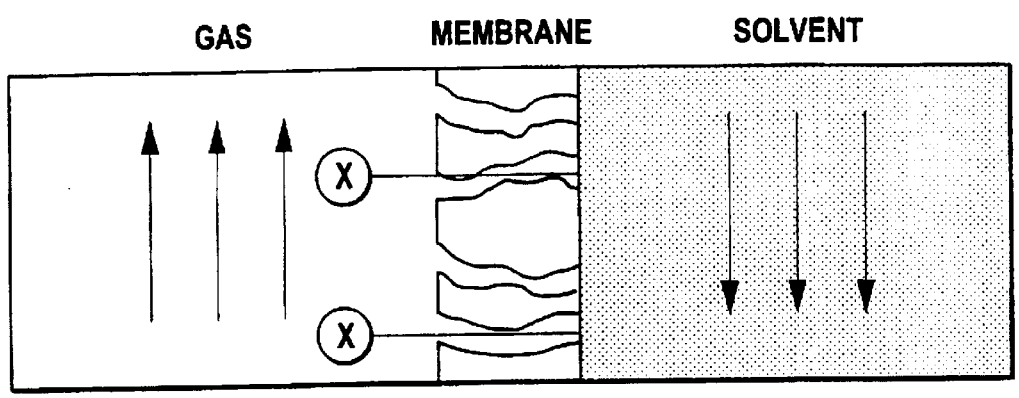
FIG. 2 is an illustration of an embodiment of a membrane gas/liquid contactor in accordance with the present invention.
Figure 3:
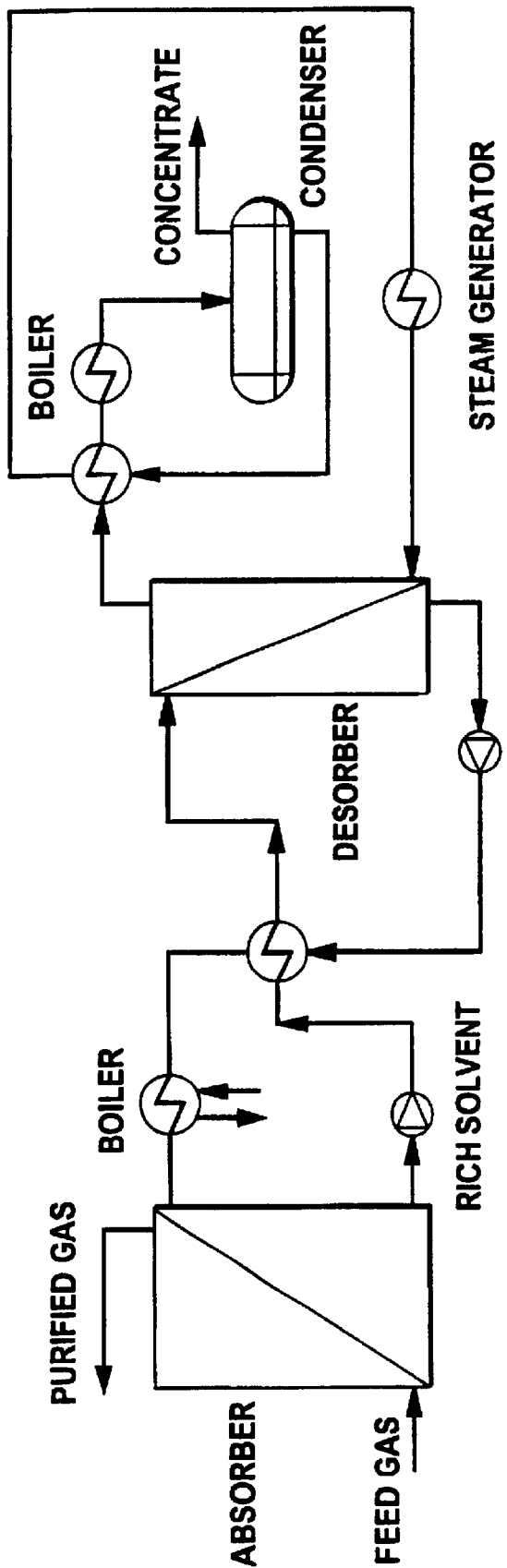
FIG. 3 is a process flow diagram illustrating an embodiment of a gas adsorption system utilizing absorber and desorber contactors in accordance with the present invention; and, FIG. 4 is an illustration of the size differences between an absorption process and a membrane absorber wherein the membrane absorber is in accordance with the present invention.

What is claimed is:

1. A method for removing and preventing discharge into the atmosphere of carbon dioxide from flue gases and natural gas from installations for production of oil and/or gas comprising:

removing carbon dioxide from said flue gases and said natural gas by passing said flue gases and said natural gas to an absorber that utilizes membrane gas/liquid contactors to absorb said carbon dioxide in a solvent, thereby substantially purifying said flue gases and said natural gas;

releasing said flue gases to the atmosphere, wherein said flue gases and said natural gas are substantially free of carbon dioxide;

separating said carbon dioxide from said solvent by passing said carbon dioxide and said solvent to a desorber, wherein said desorber uses membrane gas/liquid contactors and is supplied with an external stripping steam;

recycling said solvent, wherein said solvent is largely free of carbon dioxide, to said absorber; and compressing said carbon dioxide.

2. A method according to claim 1, wherein, in said removing and said separating, membrane contactors have a packing factor in the range 250–1000 $m^2/m^3$.

3. A method according to claim 2, wherein:

in said removing, said solvent in said absorber is employed with a mass transfer coefficient in the range $(0.1–8.0) \times 10^{-3}$ m/s and, in said separating, said solvent in said desorber is employed with a mass transfer coefficient in the range $(0.1–2.0) \times 10^{-3}$ m/s.

4. A method according to claim 3, wherein, in said removing and said separating, said solvent is an amine.

5. A method according to claim 4 wherein in said removing said gases are passed to said membrane gas/liquid contactors of said absorber at a temperature in the range of 20–70° C.

6. A method according to claim 5, wherein in said separating said carbon dioxide is removed from said membrane gas/liquid contactor of said desorber by heating to a temperature of 120–150° C.

7. A method according to claim 4, wherein in said separating said carbon dioxide is removed from said membrane gas/liquid contactor of said desorber by heating to a temperature of 120–150° C.

8. A method according to claim 3, wherein in said removing said gases are passed to said membrane gas/liquid contactors of said absorber at a temperature in the range of 20–70° C.

9. A method according to claim 3, wherein in said separating said carbon dioxide is removed from said membrane gas/liquid contactor of said desorber by heating to a temperature of 120–150° C.

10. A method according to claim 2, wherein in said removing said gases are passed to said membrane gas/liquid contactors of said absorber at a temperature in the range of 20–70° C.

11. A method according to claim 2, wherein in said separating said carbon dioxide is removed from said membrane gas/liquid contactor of said desorber by heating to a temperature of 120–150° C.

12. A method according to claim 1, wherein:
in said removing, said solvent in said absorber is employed with a mass transfer coefficient in the range $(0.1–8.0) \times 10^{-3}$ m/s and,
in said separating, said solvent in said desorber is employed with a mass transfer coefficient in the range $(0.1–2.0) \times 10^{-3}$ m/s.

13. A method according to claim 12, wherein, in said removing and said separating, said solvent is an amine.

14. A method according to claim 13, wherein in said removing said gases are passed to said membrane gas/liquid contactors of said absorber at a temperature in the range of 20–70° C.

15. A method according to claim 14, wherein in said separating said carbon dioxide is removed from said membrane gas/liquid contactor of said desorber by heating to a temperature of 120–150° C.

16. A method according to claim 13, wherein in said separating said carbon dioxide is removed from said membrane gas/liquid contactor of said desorber by heating to a temperature of 120–150° C.

17. A method according to claim 12, wherein in said removing said gases are passed to said membrane gas/liquid contactors of said absorber at a temperature in the range of 20–70° C.

18. A method according to claim 12, wherein in said separating said carbon dioxide is removed from said membrane gas/liquid contactor of said desorber by heating to a temperature of 120–150° C.

19. A method according to claim 1, wherein in said removing said gases are passed to said membrane gas/liquid contactors of said absorber at a temperature in the range of 20–70° C.

20. A method according to claim 1, wherein in said separating said carbon dioxide is removed from said membrane gas/liquid contactor of said desorber by heating to a temperature of 120–150° C.

21. A method for removing and preventing discharge into the atmosphere of carbon dioxide from flue gases comprising:
removing carbon dioxide from said flue gases by passing said flue gases to an absorber that utilizes membrane gas/liquid contactors to absorb said carbon dioxide in a solvent, thereby substantially purifying said flue gases;
releasing said flue gases to the atmosphere, wherein said flue gases are substantially free of carbon dioxide;
separating said carbon dioxide from said solvent by passing said carbon dioxide and said solvent to a desorber, wherein said desorber uses membrane gas/liquid contactors and is supplied with an external stripping steam;
recycling said solvent, wherein said solvent is largely free of carbon dioxide, to said absorber; and
compressing said carbon dioxide.

22. A method according to claim 21 wherein, in said removing and said separating, membrane contactors have a packing factor in the range 250–1000 m²/m³.

23. A method according to claim 22 wherein:
in said removing, said solvent in said absorber is employed with a mass transfer coefficient in the range $(0.1–8.0) \times 10^{-3}$ m/s; and
in said separating, said solvent in said desorber is employed with a mass transfer coefficient in the range $(0.1–2.0) \times 10^{-3}$ m/s.

24. A method according to claim 23 wherein, in said removing and said separating, said solvent is an amine.

25. A method according to claim 24 wherein, in said removing, said flue gases are passed to said membrane gas/liquid contactors of said absorber at a temperature in the range of 20–70° C.

26. A method according to claim 25 wherein, in said separating, said carbon dioxide is removed from said membrane gas/liquid contactor of said desorber by heating to a temperature of 120–150° C.

27. A method according to claim 24 wherein, in said separating, said carbon dioxide is removed from said membrane gas/liquid contactor of said desorber by heating to a temperature of 120–150° C.

28. A method according to claim 23 wherein, in said removing, said flue gases are passed to said membrane gas/liquid contactors of said absorber at a temperature in the range of 20–70° C.

29. A method according to claim 23 wherein, in said separating, said carbon dioxide is removed from said membrane gas/liquid contactor of said desorber by heating to a temperature of 120–150° C.

30. A method according to claim 22 wherein, in said removing, said flue gases are passed to said membrane gas/liquid contactors of said absorber at a temperature in the range of 20–70° C.

31. A method according to claim 22 wherein, in said separating, said carbon dioxide is removed from said membrane gas/liquid contactor of said desorber by heating to a temperature of 120–150° C.

32. A method according to claim 21 wherein:
in said removing, said solvent in said absorber is employed with a mass transfer coefficient in the range $(0.1–8.0) \times 10^{-3}$ m/s; and
in said separating, said solvent in said desorber is employed with a mass transfer coefficient in the range $(0.1–2.0) \times 10^{-3}$ m/s.

33. A method according to claim 32 wherein, in said removing and said separating, said solvent is an amine.

34. A method according to claim 33 wherein, in said removing, said flue gases are passed to said membrane gas/liquid contactors of said absorber at a temperature in the range of 20–70° C.

35. A method according to claim 34 wherein, in said separating, said carbon dioxide is removed from said membrane gas/liquid contactor of said desorber by heating to a temperature of 120–150° C.

36. A method according to claim 33 wherein, in said separating, said carbon dioxide is removed from said membrane gas/liquid contactor of said desorber by heating to a temperature of 120–150° C.

37. A method according to claim 32 wherein, in said removing, said flue gases are passed to said membrane gas/liquid contactors of said absorber at a temperature in the range of 20–70° C.

38. A method according to claim 32 wherein, in said separating, said carbon dioxide is removed from said membrane gas/liquid contactor of said desorber by heating to a temperature of 120–150° C.

39. A method according to claim 21 wherein, in said removing, said flue gases are passed to said membrane gas/liquid contactors of said absorber at a temperature in the range of 20–70° C.

40. A method according to claim 21 wherein, in said separating, said carbon dioxide is removed from said membrane gas/liquid contactor of said desorber by heating to a temperature of 120–150° C.

41. A method for removing and preventing discharge into the atmosphere of carbon dioxide from natural gas comprising:

removing carbon dioxide from said natural gas by passing said natural gas to an absorber that utilizes membrane gas/liquid contactors to absorb said carbon dioxide in a solvent, thereby substantially purifying said natural gas;

separating said carbon dioxide from said solvent by passing said carbon dioxide and said solvent to a desorber, wherein said desorber uses membrane gas/liquid contactors and is supplied with an external stripping steam;

recycling said solvent, wherein said solvent is largely free of carbon dioxide, to said absorber; and compressing said carbon dioxide.

42. A method according to claim 41 wherein, in said removing and said separating, membrane contactors have a packing factor in the range 250–1000 $m^2/m^3$.

43. A method according to claim 42 wherein:

in said removing, said solvent in said absorber is employed with a mass transfer coefficient in the range $(0.1–8.0) \times 10^{-3}$ m/s; and in said separating, said solvent in said desorber is employed with a mass transfer coefficient in the range $(0.1–2.0) \times 10^{-3}$ m/s.

44. A method according to claim 43 wherein, in said removing and said separating, said solvent is an amine.

45. A method according to claim 44 wherein, in said removing, said natural gas is passed to said membrane gas/liquid contactors of said absorber at a temperature in the range of 20–70° C.

46. A method according to claim 45 wherein, in said separating, said carbon dioxide is removed from said membrane gas/liquid contactor of said desorber by heating to a temperature of 120–150° C.

47. A method according to claim 44 wherein, in said separating, said carbon dioxide is removed from said membrane gas/liquid contactor of said desorber by heating to a temperature of 120–150° C.

48. A method according to claim 43 wherein, in said removing, said natural gas is passed to said membrane gas/liquid contactors of said absorber at a temperature in the range of 40–70° C.

49. A method according to claim 43 wherein, in said separating, said carbon dioxide is removed from said membrane gas/liquid contactor of said desorber by heating to a temperature of 120–150° C.

50. A method according to claim 42 wherein, in said removing, said natural gas is passed to said membrane gas/liquid contactors of said absorber at a temperature in the range of 20–70° C.

51. A method according to claim 42 wherein, in said separating, said carbon dioxide is removed from said membrane gas/liquid contactor of said desorber by heating to a temperature of 120–150° C.

52. A method according to claim 41
wherein:
in said removing, said solvent in said absorber is employed with a mass transfer coefficient in the range $(0.1–8.0) \times 10^{-3}$ m/s; and
in said separating, said solvent in said desorber is employed with a mass transfer coefficient in the range $(0.1–2.0) \times 10^{-3}$ m/s.

53. A method according to claim 52 wherein, in said removing and said separating, said solvent is an amine.

54. A method according to claim 53 wherein, in said removing, said natural gas is passed to said membrane gas/liquid contactors of said absorber at a temperature in the range of 20–70° C.

55. A method according to claim 54 wherein, in said separating, said carbon dioxide is removed from said membrane gas/liquid contactor of said desorber by heating to a temperature of 120–150° C.

56. A method according to claim 53 wherein, in said separating, said carbon dioxide is removed from said membrane gas/liquid contactor of said desorber by heating to a temperature of 120–150° C.

57. A method according to claim 52 wherein, in said removing, said natural gas is passed to said membrane gas/liquid contactors of said absorber at a temperature in the range of 20–70° C.

58. A method according to claim 52 wherein, in said separating, said carbon dioxide is removed from said membrane gas/liquid contactor of said desorber by heating to a temperature of 120–150° C.

59. A method according to claim 41 wherein, in said removing, said natural gas is passed to said membrane gas/liquid contactors of said absorber at a temperature in the range of 20–70° C.

60. A method according to claim 41 wherein, in said separating, said carbon dioxide is removed from said membrane gas/liquid contactor of said desorber by heating to a temperature of 120–150° C.

* * * * *